United States Patent
Mominee et al.

[11] 3,808,394
[45] Apr. 30, 1974

[54] CREATING HOLES IN FLEXIBLE MEMBERS

[75] Inventors: David E. Mominee, Covina; Gilbert W. Vance, El Monte, both of Calif.

[73] Assignee: Anjac Plastics, Inc., El Monte, Calif.

[22] Filed: Mar. 31, 1972

[21] Appl. No.: 239,921

[52] U.S. Cl............ 219/121 LM, 219/384, 264/22, 264/25
[51] Int. Cl............................................. B23k 27/00
[58] Field of Search.......... 219/121 EB, 121 L, 384; 264/22, 25, 154, 155, 156; 138/114, 125, 148; 239/145

[56] References Cited
UNITED STATES PATENTS

| | | | |
|---|---|---|---|
| 3,549,733 | 12/1970 | Caddell | 219/121 LM |
| 3,314,073 | 4/1967 | Becker | 219/121 L |
| 3,626,143 | 12/1971 | Fry | 219/121 LM |
| 3,325,819 | 6/1927 | Fraser | 219/121 L |
| 3,594,261 | 7/1971 | Broerman | 219/121 LM |
| 3,226,527 | 12/1965 | Harding | 219/121 L |
| 3,562,377 | 2/1971 | Zetzsche | 264/156 |
| 3,698,145 | 10/1972 | Chapin | 138/114 |
| 3,524,046 | 8/1970 | Brouwer | 214/121 L |
| 3,619,550 | 11/1971 | Matthews | 214/121 L |
| 3,612,814 | 10/1971 | Houldcroft | 214/121 L |
| 3,617,702 | 11/1971 | Flournoy | 214/121 LM |
| 3,601,320 | 8/1971 | Plessis | 138/114 X |

OTHER PUBLICATIONS

"Lasen Welding and Drilling Applications" Welding Journal, 2/71, pp. 97–106.
"Precise Perforations Every Time" Tool and Manufacturing Engineer, pp. 46–49, 11/69

*Primary Examiner*—J. V. Truhe
*Assistant Examiner*—George A. Montanye

[57] ABSTRACT

A small hole may be located in a wall of a flexible member or structures such as a tube of a thermoplastic material and, if desired, in an internal wall within such a tube by contacting such a wall or walls with a laser beam serving to heat the area or areas where such a hole or holes are to be created for a time sufficient to enable such a beam to heat the material contacted to create such a hole or holes. Preferably the tube is held against a surface of a moving member as the beam is directed so as to engage only a single point on the surface of the tube.

8 Claims, 8 Drawing Figures

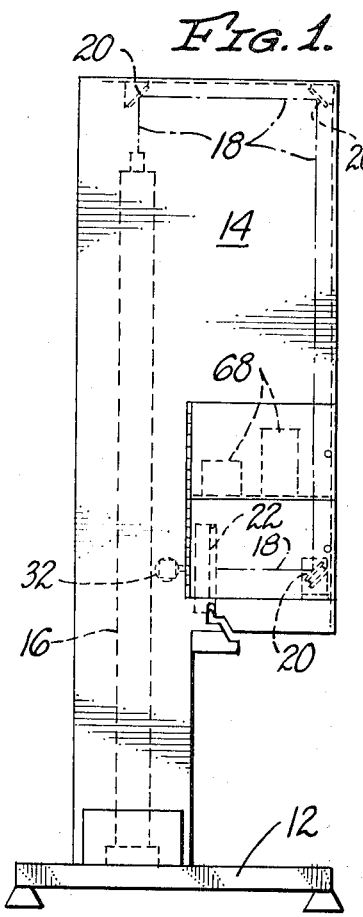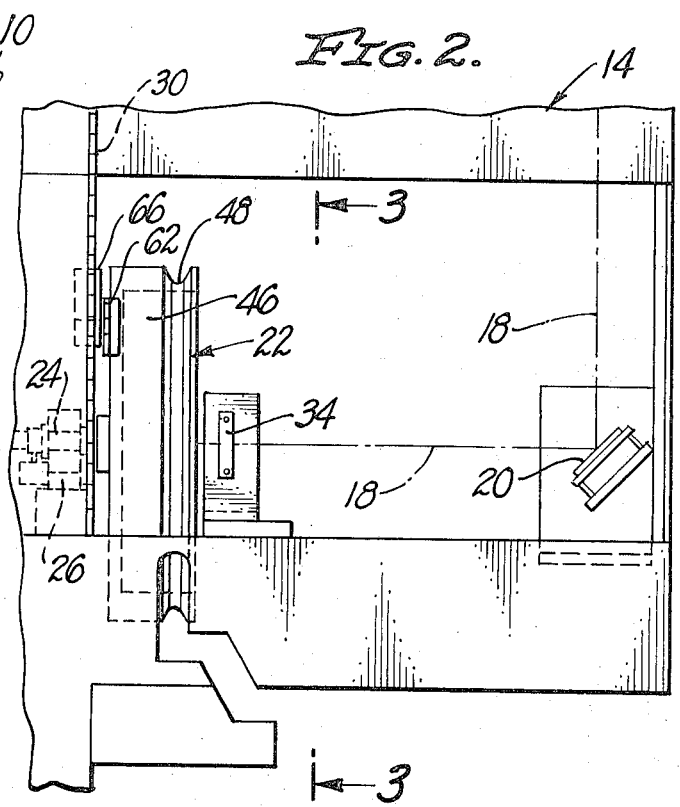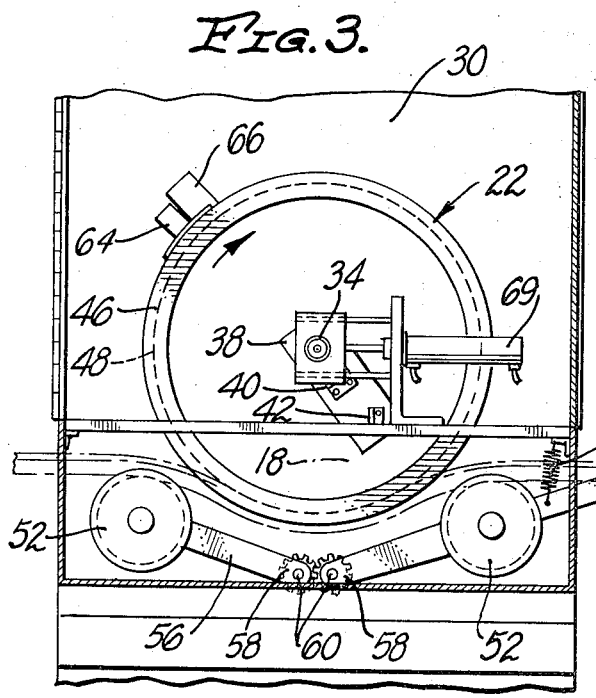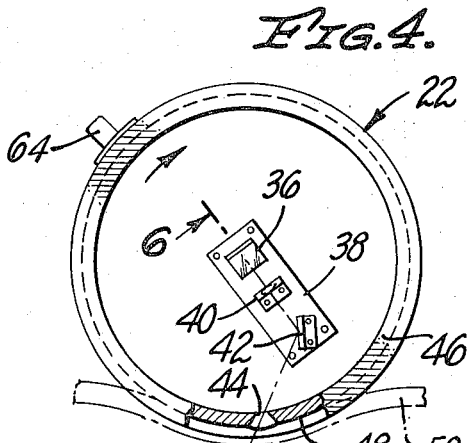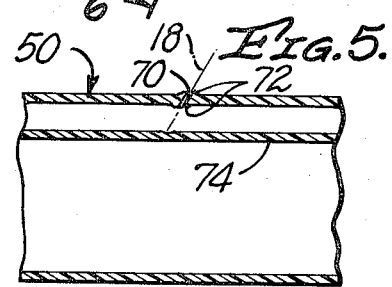

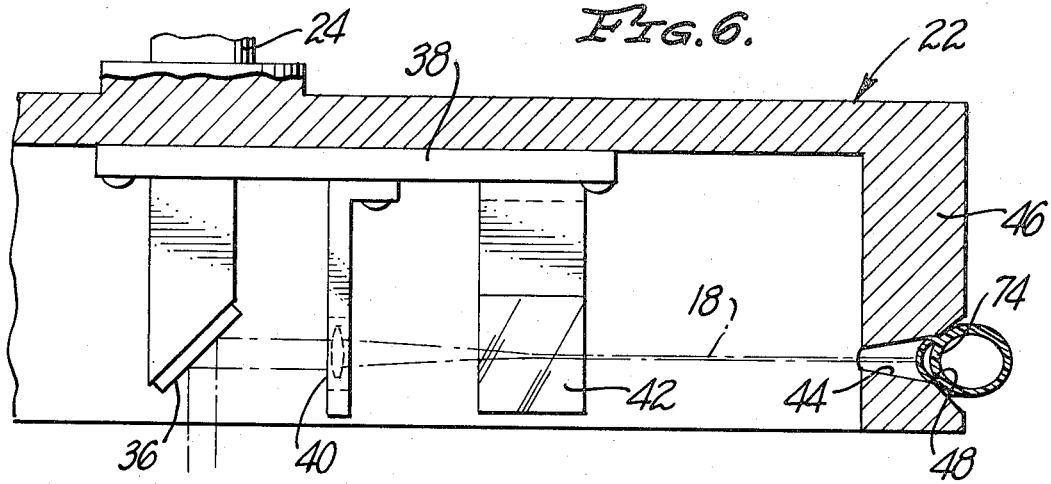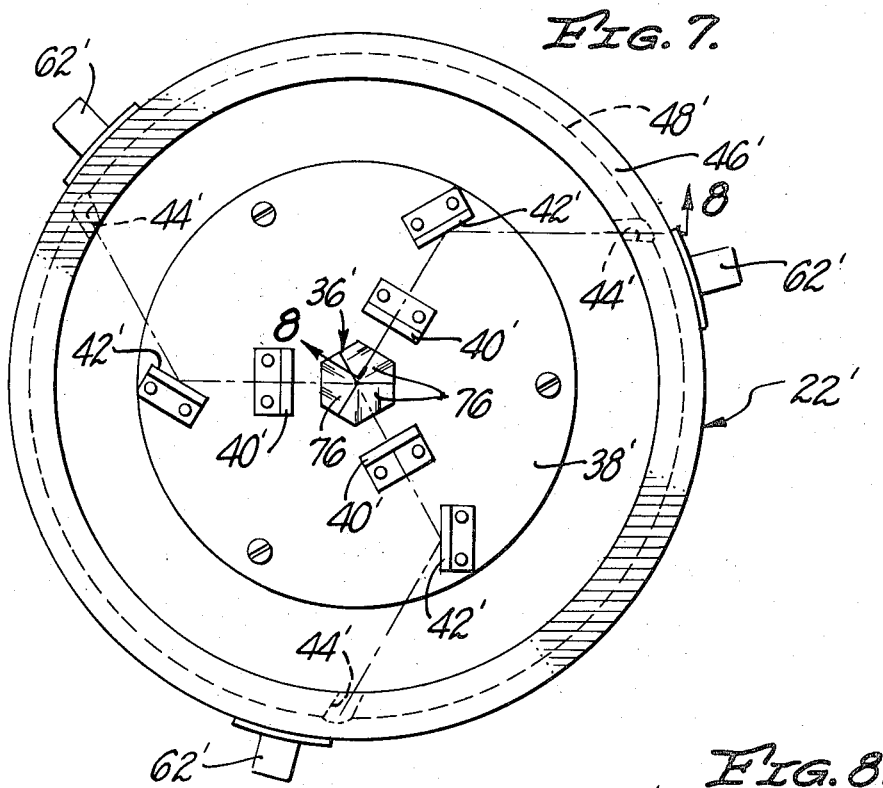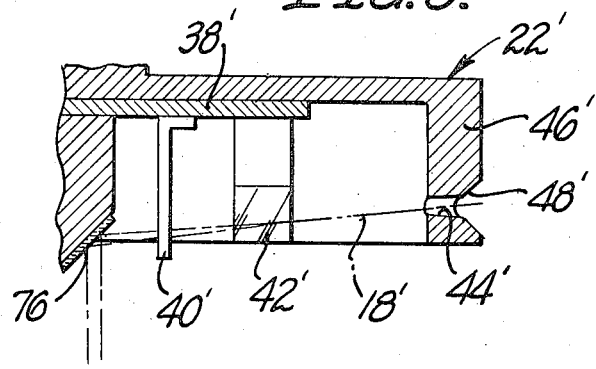

3,808,394

CREATING HOLES IN FLEXIBLE MEMBERS

CROSS-REFERENCE TO RELATED APPLICATIONS

Donald E. Mock application Ser. No. 197,242 filed Nov. 10, 1971, entitled "Irrigation Conduit."

BACKGROUND OF THE INVENTION

The invention described in this specification is primarily intended to be utilized in conjunction with the production of tubes to be utilized for water distribution purposes, but which are also capable of being used for other purposes. It is also capable of being used with other flexible structures or members. Such tubes are commonly utilized as irrigation conduits. They are formed so as to include periodically spaced external holes used to distribute water from their interiors to their exteriors at various spaced points along their lengths.

The simplest form of such a tube consists of an elongated tubular member, normally a member of circular cross-sectional configuration, having comparatively fine holes spaced along its length. It has been discovered that tubes having an internal wall dividing them into two internal sections and having periodically spaced holes in this internal wall are more desirable than simple tubes having undivided interiors for water distribution purposes because with such internally divided tubes it is possible to obtain a pressure step-down effect tending to restrict the amounts of water emitted from the external holes employed.

With both of these types of tubular irrigation conduits a problem has been encountered in creating the holes used so that these holes are of a carefully controlled dimension so that the amounts of water emitted through them and/or passing through them will be regulated in order to achieve substantially uniform water distribution along the length of a tube and/or in order to achieve controlled water distribution along the length of a tube. In connection with this it will be realized that such controlled water distribution is necessary for efficient, economic irrigation without the waste of water.

This problem is considered to be particularly severe because of the fact that strength—material thickness considerations—have made it desirable to utilize seamless tubes for water or similar distribution purposes. Such seamless tubes are comparatively hard to process utilizing conventional hole producing methods so that holes are created in them which are extremely uniform in character and/or are of a carefully controlled character, and which are of such a nature that their interiors do not contain internal fragments or projections which might interfere with a controlled or metered distribution of water.

SUMMARY OF THE INVENTION

An objective of the present invention is to provide for the improved production of periodically spaced holes extending along the lengths of tubes as indicated in the preceding. A further objective of the present invention is to provide for the convenient economic, rapid production of holes of a uniform and/or desired character along the lengths of tubes of the type indicated or along the lengths of other flexible members or structures, including the production of holes in interior walls within tubes or structures having such walls.

From a consideration of these broad objectives of the invention it will be realized that the invention is intended to provide a new method for the production of holes within tubes or conduit or other flexible structures as indicated. An objective of the present invention is also to provide an efficient, reliable apparatus for the production of such holes, including holes within at least one internal wall within them. The invention is considered to be particularly significant in that it can be practiced so as to create such holes in seamless tubing without creating holes extending completely through such tubing, that is without creating holes which extend through opposite sides of such tubing.

In accordance with this invention holes as are indicated may be located in a wall of a flexible member such as a tube of a thermoplastic material and, if desired, in an internal wall within such a tube by contacting such a wall or walls with a laser beam serving to heat the area or areas where such a hole or holes are to be created for a time sufficient to enable such a beam to heat the material contacted to a sufficient extent to create the hole or holes being formed. Preferably these steps are carried out utilizing an apparatus as herein described employing a continuous moving member against the surface of which the tube being perforated is held and using laser means operated at periodic intervals to create a laser beam and control means to control the laser beam so that it engages a particular spot or area where a hole or holes are being created on the tube as the tube moves along with the moving member.

BRIEF DESCRIPTION OF THE DRAWINGS

A brief summary of this type is inherently incapble of delineating many facets and features of an invention which are significant and important and indicating many advantages of an invention as are normally apparent to one skilled in the art of the invention from a detailed study of it. It is considered that such items will be apparent to one skilled in the field of this invention from a detailed consideration of the remainder of this specification, the appended claims and the accompanying drawings in which:

FIG. 1 is an end elevational view of a presently preferred apparatus for carrying out this invention in accordance with the concepts herein set forth;

FIG. 2 is an enlarged view of part of the structure shown in FIG. 1;

FIG. 3 is a partial cross-sectional view taken at line 3—3 of FIG. 2;

FIG. 4 is a diagrammatic view indicating the operation of certain of the parts shown in the preceding figures;

FIG. 5 is a partial cross-sectional view illustrating the angle at which a laser beam preferably is used so as to intercept a tube processed in accordance with this invention;

FIG. 6 is a partial cross-sectional view of a diagrammatic pipe illustrating the path taken by a laser beam taken along line 6—6 of FIG. 4;

FIG. 7 is a view corresponding to FIG. 4 showing a modified moving member and associated parts capable of being used in accordance with the concepts of this invention; and FIG. 8 is a view corresponding to FIG. 6 taken along line 8—8 of FIG. 7.

In considering this invention it is to be realized that the particular structures shown in the drawings are not the invention itself inasmuch as the invention itself consists of certain intangible concepts as are set forth or defined in the appended claims forming a part of this disclosure. Through the use of routine engineering skill these concepts or features can be embodied within or used with other apparatuses than the specific structure shown.

DETAILED DESCRIPTION OF THE PREFERRED EMBODIMENT

In FIG. 1 of the drawings there is shown an apparatus 10 in accordance with the invention which includes a conventional base 12 supporting an upstanding housing 14. Within the interior of this housing 14, there is located a known, preferably conventional means or apparatus 16 for generating a laser beam 18. Because of the fact that equipment of the type of the apparatus 16 is well-known at the present time it is not considered necessary to discuss it in detail in this specification.

For similar reasons it is not considered necessary to discuss in this specification in detail the nature of the beam 18. It is well-known that such a beam 18 composed of coherent, monochromatic light waves. Various different light sources can be utilized as the apparatus 16 provided that such sources are capable of generating or creating a laser beam which has sufficient energy so as to heat a thermoplastic or other flexible material in order to create a hole or opening in such material.

In the apparatus 10 such a beam 18 is reflected against a series of three mirrors 20 mounted with the housing 14 so that the beam 18 travels horizontally towards the center region of a wheel 22 serving as a continuous moving member as hereinafter indicated. This wheel 22 is mounted upon a shaft 24 supported by a bearing 26 located on an internal wall 30 within the housing 14. A conventional motor, such as a known variable speed motor 32 may be connected to the shaft 24 so as to rotate it. Other conventional mechanical means can be used to rotate the wheel 22.

Preferably the beam 18 travels towards the wheel 22 along the axis of this wheel 22 so as to pass through a known, conventional so-called trimmer 34 in such a manner as to engage a mirror 36 set at a 45° angle to the plane of the wheel 22. This trimmer 34 is preferably used in a conventional manner during the operation of the apparatus 10 so as to control the beam 18 used. It is considered well-established to control the size, energy and diffraction of a beam such as the beam 18 by a device of the type of the trimmer 34. Such beam control is considered necessary in order to obtain satisfactory operation of the apparatus 10.

For convenience the mirror 36 is mounted on a small mounting plate 38 which is secured to the wheel 22. In the apparatus 10 this mounting plate 38 also holds a known condensing lens 40 located in the path of the beam 18 as it is reflected by the mirror 36 and another mirror 42 which reflects the beam 18 as it passes the lens 40 towards a small opening 44 located in a peripheral flange 46 formed on the periphery of the wheel 22.

The flange 46 is of a depth and configuration corresponding to a part of the depth of a tube 50 to be perforated in accordance with the invention. This tube 50 preferably should be of a conventional flexible thermoplastic material such as a known plasticized vinyl polymer composition or other similar composition. In effect the groove 48 should be sufficiently deep so that the tube 50 may be held by tension wheels 52 within it without relative motion between the tube 50 and the flange 46 during the operation of the apparatus 10.

These tension wheels 52 are mounted upon arms 54 and 56 which are secured to small coacting gears 58. Both these arms 54 and 56 and the gears 58 are rotatably mounted upon shafts 60 so that a single biasing means such as the spring 62 working against either of the arms 54 or 56 will tend to bias both of the wheels 52 to the same degree in such a manner as to hold the tube 50 as indicated in FIG. 3 of the drawings within the groove 48 to a uniform extent as a specific portion or area of this tube 50 moves along with the wheel 22 as this wheel 22 is rotated.

As the apparatus 10 is operated so that the tube 50 moves in this manner specific regions of the tube 50 move at the same rate as the interior or the groove 48 as the wheel 22 is turned. With the embodiment of the invention shown during each revolution of the wheel 22 a small steel member 64 on the periphery of this wheel 22 moves past a known magnetic switch 66 capable of being actuated by such movement. Each time the wheel 22 turns in this manner the switch 66 is thus actuated. Each time this switch 66 is actuated an electric signal is supplied through it to a known conventional control apparatus 68. When this apparatus 68 is actuated in this way, it serves to operate the apparatus 16 so as to cause the laser beam 18 to be generated or created.

Once this beam 18 comes into existence it travels along a path as indicated. As it is being created the trimmer 34 is operated in a conventional manner through the operation of an actuating cylinder 69 connected to the control apparatus 68 so as to also be operated in a conventional manner. The beam 18 passing through the trimmer 34 will engage the mirror 36 and will be adjusted by the lens 40 and then will be further reflected by the mirror 42 towards the opening 44. By virtue of the movement of the wheel 22 and the construction described, this beam 18 will be directed towards the opening 44 as long as it is generated and applied as described.

Since the tube 50 moves in synchronism with the periphery of the wheel 22, this beam 18 will thus engage a given area of the tube 50 as this tube 50 moves, but as there is no relative motion between the tube 50 and the wheel 22. The member 64 and the switch 66 are positioned so that this beam 18 will be generated at about the point of initial travel of the tube 50 with the periphery of the wheel 22. The control apparatus 68 will operate to continue the generation of the beam 18 until about the point immediately prior to the tube 50 separating from the wheel 22 so that the beam 18 is applied to the tube 50 for as long a period as is reasonably possible.

As the concentrated energy from the beam 18 is applied in this manner the energy from this beam 18 will serve to heat the spot in which it is applied. This will cause a degree of vaporization and a degree of melting in the material in this spot. This energy will thus cause the formation of a hole 70 in the tube 50. As the melting occurs it is considered that normally the heated material moves so that the interior of the hole 70 is defined by a smooth, continuous internal wall of a uniform cross-sectional configuration and that small hubs or bosses 72 are created at both ends of this hole 70 from the material contacted by the beam 18. These hubs or bosses 72 are, of course, created in such a manner that they are integral with and form a part of the tube 50. The actual formation of these hubs 72 is considered to be dependent upon the operation of the apparatus 10. Under some circumstances it may not be formed.

The apparatus 10 is constructed in such a manner that the particular hole 70 is formed during only the initial part of the travel of the tube 50 with the periphery of the wheel 22 so that the beam 18 used will intercept an inner wall 74 within this tube 50 as indicated in FIG. 5 of the drawings during the last portion of the travel of the tube 50 with the wheel 22. It will be realized that in intercepting this inner wall 74 the beam 18 travels through the hole 70 which has been utilized in creating it. As this beam 18 intercepts the wall 74 it will serve to heat the intercepted area or region of the wall 74 so as to create within it another hole corresponding to the hole 70.

The control apparatus 68 is operated by the switch 66 so that each time a hole 70 is to be formed as indicated the apparatus 68 causes actuation of the apparatus 16 creating the beam 18 described. As the beam 18 is created and passes as indicated this beam 18 will pass through the trimmer 34 so that its size, energy and diffraction are controlled in such a manner that the depth to which the beam 18 will penetrate the tube 50 will be regulated to a desired degree. Because of its function, the control apparatus 68 serves as a timing device for the creation of the beam 18 at periodic intervals of desired duration which is synchronized with the movement of the wheel 22.

By virtue of this method of operation a single hole may be created in a length of a seamless or other tube without damaging or effecting a wall or walls of such tube roughly opposite from where the hole is created. This is considered to be quite important. With the apparatus 10 by appropriated adjustment of the mirror 42 a second hole created within an internal wall can be created at either a point in the same plane transverse to the axis of the tube such as the tube 50, or may be created at an angle to such a plane. It is considered preferable to create such a second hole at an angle as indicated so as to avoid direct flow effects involving something of a jet action leading from one hole to another in a tube such as the tube 50 when such a tube is to be employed in irrigation or similar applications.

For such applications it is considered that normally it will be preferable to have all of the holes used of the same diameter. One virtue of the apparatus 10 lies in the fact that it is possible to insert within the control apparatus 68 a conventional counting type mechanism which will actuate the apparatus 16 so that successive beams 18 contain either increased or decreased energy. By regulating the energy in this manner or by controlling the time when beams 18 are applied, it is possible to regulate the dimensions of any holes created so that such successive holes are either of an increased or decreased size.

Extremely small changes in the measurement of holes created in this manner may be quite advantageous in providing tubes such as the tube 50 which are to be utilized in comparatively long lengths in that with such gradations in hole size it is possible to provide tubes which will emit from the various different holes used approximately the same amounts of water even though there will be a pressure drop in the water within the interiors of such tubes due to their lengths and the configurations to which they may be bent. It is to be realized that extremely small changes in hole diameters are normally required to accomplish such compensations for fluid pressure drop.

In FIGS. 7 and 8 of the drawings there is shown a modified wheel 22' which is extremely similar to the wheel 22 previously described and which can be utilized with the apparatus 10. For convenience of explanation various parts of the wheel 22' which are the same or substantially the same as parts previously described are not indicated herein in a separate manner and are designated in the drawings and in the remainder of this specification by the primes of the numerals previously used to designate such parts.

The wheel 22' is primarily intended to be utilized when it is desired to create a series of holes such as the hole 70 which are located more closely together than possible with the wheel 22. It employs a plurality of the openings 44', a plurality of the mirrors 42' and a plurality of the condensing lens 40'. In place of the mirror 36 the wheel 22' employs a single multi-sided mirror 36' having sloping faces 76 which are directed to deflect a beam 18' to any of the sets of lens 40' and mirrors 42' towards any of the openings 44' as there is actuation and operation as previously described. With an apparatus 10 utilizing this wheel 22' the beam 18' should be directed towards the mirror 36' as shown in FIG. 8 of the drawings so as to hit successive faces 76.

From a consideration of the preceding it will be realized that the apparatus 10 is essentially a very simple apparatus which may be utilized in the rapid production of holes as described in tubing of a thermoplastic character. This apparatus 10 may be constructed with a minimum of difficulty and is essentially simple to operate, yet it is extremely effective for its intended purpose.

It is considered that one of the reasons the described apparatus 10 is particularly effective relates to the fact that this apparatus is constructed as indicated so that the laser beam 18 engages the tube 50 at a constant angle as this beam 18 is applied to the tube 50. This is considered to contribute to the desired character of holes such as the hole 70 created as indicated in the preceding discussion. It will be realized that this angle can be adjusted as indicated in the preceding discussion. In a similar way the length of time that the beam 18 engages a tube such as the tube 50 can be varied through conventional type operation of the control means 68 so that at successive periodic intervals a hole will not be created in the internal wall 74.

By providing appropriate, conventional lens systems, such as by using other than a condensing lens 40, the beam 18 may be made to assume a conical type of shape in the region where it engages either the tube 50 or the internal wall 74 so that either the hole created in the exterior of of the tube 50 or the hole created in the internal wall 74 will be larger than the other in accordance with the diameter of the beam as it creates either of these holes. Obviously the larger the beam creating a specific hole, the more contact with the beam necessary to create a hole.

Because of the fact that the invention can be utilized in various different ways as indicated, it will be apparent that the invention involves the broad operative features or principles set forth in the preceding discussion. These principles or features are set forth in the appended claims forming a part of this disclosure.

We claim:

1. A process in which a laser beam is used to form a hole in a body in which the improvement comprises:
continuously moving said body by holding a portion of said body in contact with a rotating wheel while concurrently reflecting said beam against a rotating mirror so that said beam is directed towards a specific point along the portion of said body in contact with said wheel, at a constant angle relative to said point, for a time period which is effective to cause said beam to form a hole in said body.

2. A process as claimed in claim 1 wherein:
said body is a hollow, tubular body, and
said time period is sufficiently short so that said beam only forms said hole in said tube and does not form any other hole leading to the exterior of said tube.

3. A process for creating an exterior hole in an exterior wall of a tube without affecting said tube except where such an exterior hole is to be created, which process comprises rotating a wheel to move a portion of said tube into contact along the periphery of said wheel:
directing a laser beam against an area of said exterior wall along a portion of the tube in contact with the periphery of said wheel from the outside of said tube by reflecting said beam off of a rotating mirror so that said beam engages said area of said exterior wall at an unchanging angle with respect to said exterior wall for a sufficient time for said beam to heat said area to form said exterior hole, said time being sufficiently short so that said beam does not heat the interior of said tube other than where said exterior hole is formed.

4. A process as claimed in claim 3 wherein:
a plurality of said exterior holes are formed in said exterior wall of said tube by so directing said beam against successive areas along the length of said tube.

5. A process as claimed in claim 4 wherein:
the dimensions of said exterior holes formed by so directing said beam against successive areas are varied by varying the energy so directed to such successive areas.

6. A process as claimed in claim 3 wherein:
said tube has an internal wall dividing the interior of said tube into segregated areas and when said bean is so directed against said area to form said exterior hole it is so directed against said area for an additional sufficient time so that said beam will pass through said hole so as to heat an area of said internal wall to form an internal hole in said internal wall, said additional time being sufficiently short so that said beam does not heat the interior of said tube other than where said holes are formed.

7. A process as claimed in claim 6 wherein:
said beam is so directed at said tube at an angle which is not perpendicular relative to said first mentioned area so that said internal hole in said internal wall will be offset with respect to said exterior hole in said exterior wall along the length of said tube.

8. A process as claimed in claim 6 wherein:
a plurality of said interior and exterior holes are formed in said interior and exterior walls of said tube by so directing said beam against successive areas along the length of said tube.

* * * * *